US012206134B2

(12) United States Patent
Broekelmann et al.

(10) Patent No.: US 12,206,134 B2
(45) Date of Patent: Jan. 21, 2025

(54) METHOD FOR ELECTRICALLY CONTACTING A BATTERY BLOCK

(71) Applicant: HESSE GmbH, Paderborn (DE)

(72) Inventors: Michael Broekelmann, Delbrueck (DE); Hans-Juergen Hesse, Paderborn (DE); Matthias Hunstig, Paderborn (DE)

(73) Assignee: Hesse GmbH, Paderborn (DE)

( * ) Notice: Subject to any disclaimer, the term of this patent is extended or adjusted under 35 U.S.C. 154(b) by 829 days.

(21) Appl. No.: 17/193,862

(22) Filed: Mar. 5, 2021

(65) Prior Publication Data
US 2021/0194102 A1    Jun. 24, 2021

Related U.S. Application Data

(63) Continuation of application No. PCT/DE2019/100704, filed on Aug. 2, 2019.

(30) Foreign Application Priority Data

Sep. 5, 2018   (DE) .................... 10 2018 121 696.3

(51) Int. Cl.
*H01M 50/516*    (2021.01)
*H01M 50/213*    (2021.01)
(Continued)

(52) U.S. Cl.
CPC ....... *H01M 50/516* (2021.01); *H01M 50/213* (2021.01); *H01M 50/514* (2021.01);
(Continued)

(58) Field of Classification Search
CPC ............. H01M 50/516; H01M 50/521; H01M 50/522; H01M 50/213; H01M 50/514
See application file for complete search history.

(56) References Cited

U.S. PATENT DOCUMENTS 10,396,334 B2    8/2019 Choi et al.
2003/0157402 A1*  8/2003 Hamada ............. H01M 50/529
                                                    429/176
(Continued)

FOREIGN PATENT DOCUMENTS

EP     3109925 A1    12/2016
JP     H0474445 A     3/1992

OTHER PUBLICATIONS

International Search Report dated Nov. 6, 2019 in corresponding application PCT/DE2019/100704.
(Continued)

*Primary Examiner* — Kenneth J Douyette
(74) *Attorney, Agent, or Firm* — Muncy, Geissler, Olds & Lowe, P.C.

(57) ABSTRACT

An ultrasonic bonding method for electrical contacting a plurality of battery cells of a battery block. A first connection point is produced in that a bonding tool is heated directly, and a first connection contact surface of a first battery cell and/or a connection conductor is/are heated locally and indirectly by a laser beam directed toward the bonding tool. The connection conductor is pressed against the first connection contact surface of the first battery cell. The bonding tool is excited to vibrate ultrasonically, the ultrasonic vibrations being transferred from the bonding tool to the connection conductor. A second connection point is produced in that the connection conductor is pressed against a second connection contact surface of a second battery cell of the battery block or a common connection contact of the battery block by the bonding tool and excited to vibrate ultrasonically.

15 Claims, 11 Drawing Sheets

(51) Int. Cl.
    *H01M 50/514*     (2021.01)
    *H01M 50/521*     (2021.01)
    *H01M 50/522*     (2021.01)
    *H01M 50/528*     (2021.01)
    *H01M 50/296*     (2021.01)

(52) U.S. Cl.
    CPC ....... *H01M 50/521* (2021.01); *H01M 50/522* (2021.01); *H01M 50/528* (2021.01); *H01M 50/296* (2021.01)

(56) References Cited

U.S. PATENT DOCUMENTS

| | | | | |
|---|---|---|---|---|
| 2006/0222942 | A1* | 10/2006 | Zhao | H01M 10/0431 |
| | | | | 429/180 |
| 2007/0047796 | A1* | 3/2007 | Anantharaman | B29C 66/612 |
| | | | | 228/103 |
| 2017/0125774 | A1* | 5/2017 | Choi | H01M 50/211 |

OTHER PUBLICATIONS

International Preliminary Report on Patentability dated Mar. 18, 2021 in corresponding application PCT/DE2019/100704.

\* cited by examiner

METHOD FOR ELECTRICALLY CONTACTING A BATTERY BLOCK

This nonprovisional application is a continuation of International Application No. PCT/DE2019/100704, which was filed on Aug. 2, 2019, and which claims priority to German Patent Application No. 10 2018 121 696.3, which was filed in Germany on Sep. 5, 2018, and which are both herein incorporated by reference.

BACKGROUND OF THE INVENTION

Field of the Invention

The present invention relates to a method for electrically contacting a plurality of battery cells of a battery block.

Description of the Background Art

In practice, battery blocks today are electrically contacted by laser welding. In this regard, the material is locally heated and/or initially melted with the aid of a laser beam, and/or metal spatters and/or impurities occur due to the heating, which may result in an impairment of the battery function. In contrast, however, electrically connecting battery cells of a battery block by means of ultrasonic bonding is not regularly successful today, or only to a limited extent. The fact that the substrate is resilient, soft or elastic or tends toward resonant vibrations contributes hereto. As a result, optimal prerequisites for ultrasonic bonding are thus not a useful option. However, the electrical connection contact surfaces of the battery cells cannot be or can only insufficiently be bonded with common means, due to their hardness, their granularity and their lattice structure. The materials used for the battery blocks and ultrasonic bonding as a manufacturing method are thus largely incompatible.

SUMMARY OF THE INVENTION

It is therefore an object of the present invention to provide a modified ultrasonic bonding method, which makes it possible to electrically contact battery cells of a battery block.

As a result, it is provided according to an exemplary embodiment of the invention that the ultrasonic bonding method for electrically contacting a plurality of battery cells of a battery block comprises the following steps: a first connection point is produced in that a bonding tool is heated directly, and a first connection contact surface of a first battery cell and/or the connection conductor is/are heated locally and indirectly in each case by a laser beam directed toward the bonding tool and provided by a laser, in that the connection conductor is pressed against the first connection contact surface of the first battery cell with the aid of the bonding tool, and in that the bonding tool is excited to vibrate ultrasonically, the ultrasonic vibrations being transferred from the bonding tool to the connection conductor; and second connection point is produced in that the connection conductor is pressed against a second connection contact surface of a second battery cell of the battery block or a common connection contact of the battery block by the bonding tool and excited to vibrate ultrasonically.

The special advantage of the invention is that, as a result of the invention, the battery cells may be contacted by means of ultrasonic bonding, since the hardness, the granularity or the material properties of the connection points are influenced by the laser, and the electrical contacting of battery blocks may be produced particularly economically, i.e. quickly and cost-effectively, by means of ultrasonic bonding. In particular, the method according to the invention is suitable for series production, since the established test routines for ultrasonic bonding may be used to continuously control the bonding process or carry out a subsequent quality test. In this respect, a large number of battery cells, which are connected to form battery blocks, may be reliably processed.

The ultrasonic bonding method according to the invention may furthermore be effectively automated so that it is suitable, in particular, for manufacturing battery blocks for the automotive industry. For example, commercial battery cells may be preassembled and electrically contacted as needed.

With regard to the sequence of the work steps according to the method, it is not important whether the first connection point is produced first, followed by the second connection point, or whether the second connection point is produced first, followed by the first connection point. Those skilled in the art will specify the sequence in knowledge of the special considerations of the process.

The second connection contact surface or the common connection contact of the battery block can be heated indirectly with the aid of the heated bonding tool and locally in each case during the production of the second contact point. The ultrasonic bonding process may be advantageously further optimized and, in particular, accelerated by heating the second connection contact surface. In addition, the ultrasonic bonding method according to the invention may be applied if the contact partner for the connection conductor is difficult to bond at the second connection point, just like the first connection contact surface of the first battery cell, due to its hardness, its granularity, its lattice structure or its otherwise material or structural constitution.

In particular, it may be provided according to the invention that the first connection contact surface and/or the second connection contact surface can be provided as a connection contact surface made from a nickel-coated steel, from CuSn6, CuFe2 or by an Sn-coated surface. The common connection contact may be manufactured, for example, from copper or aluminum. The first connection contact surface and/or the second connection contact surface may be provided, for example, by a substance or a material which does not have a plane-centered cubical lattice structure.

For example, a strip having an essentially rectangular cross-section may be used as the connection conductor for ultrasonic strip bonding, or a wire having a round cross-section may be used for ultrasonic wire bonding. The connection conductor may be provided, for example, from aluminum or copper.

A plurality of first connection contact surfaces of different first battery cells can be connected to a shared common connection contact by a number of connection conductors corresponding to the number of different first battery cells. By providing the shared common connection contact for a plurality of battery cells of the same type, the connection of the battery block manufactured by the ultrasonic bonding method according to the invention may be advantageously simplified. The battery block or the jointly interconnected battery cells may be electrically contacted, in particular via the shared common connection contact. For example, multiple common connection contacts may be provided on one battery block, which each provide the electrically conductive connection to a plurality of first battery cells and/or second battery cells.

The first connection point of the first battery cell can be formed and connected to a second connection point, which is provided on an adjacent second battery cell. Due to the ultrasonic bonding method according to the invention, it is thus possible to provide a series connection of different battery cells and to hereby influence the voltage provided with the aid of the battery cell via the production or contacting method.

The heating of the first connection contact surface and/or the second connection contact surface and/or the common connection contact can take place while the connection conductor is being pressed against the first connection contact surface and/or the second connection contact surface and/or the common connection contact by the heated bonding tool, and/or while the connection conductor is being excited to vibrate ultrasonically. A support of the ultrasonic bonding by the additional provision of thermal energy advantageously results hereby. The rigidity or hardness of the connection contact surfaces or the common connection contacts may be reduced hereby or dislocation movements in the metal lattice may be favored with the result that materials are bondable which are customary in battery manufacturing but are otherwise unbondable or bondable only to a limited extent.

The laser may be deactivated or a power of the laser may be reduced and optimally lowered to zero during the course of producing the first connection point and/or the second connection point. This applies, in particular, when it is detected, based on process parameters ascertained during the ultrasonic bonding, that the integral connection of the connection conductor to the connection contact surface or the common connection contact may be reliably established and/or an impermissibly high heating of the connection contact surface is detected.

The bonding tool can be heated before the connection conductor is pressed against the connection contact surface or the common connection contact by the bonding tool or is excited to vibrate ultrasonically. Due to the preheating of the bonding tool, individual steps of the ultrasonic bonding method according to the invention may be carried out in parallel for the purpose of thereby speeding up the manufacturing process as a whole or making it economical. In particular, the bonding tool may be heated while it is being repositioned for the next bond.

The laser may be operated in a pulsed manner. A sufficient as well as uniform heating of the bonding tool, the connection contact surface or the common connection contact results, due to the inertia of the heat flow. The pulsing operation of the laser is useful, for example, if it is not possible to variably set a power of the laser. The thermal energy supplied to the bonding process is then influenced by the timing of the laser beam.

One or more sensors may be provided on the device side to detect a temperature or a mechanical constitution of the connection contact surface or the common connection contact. With the aid of the sensors, the process parameters for the laser, in particular a laser power or an activation duration of the laser, may thus be determined and possibly controlled, so that a setpoint time characteristic may be mapped.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
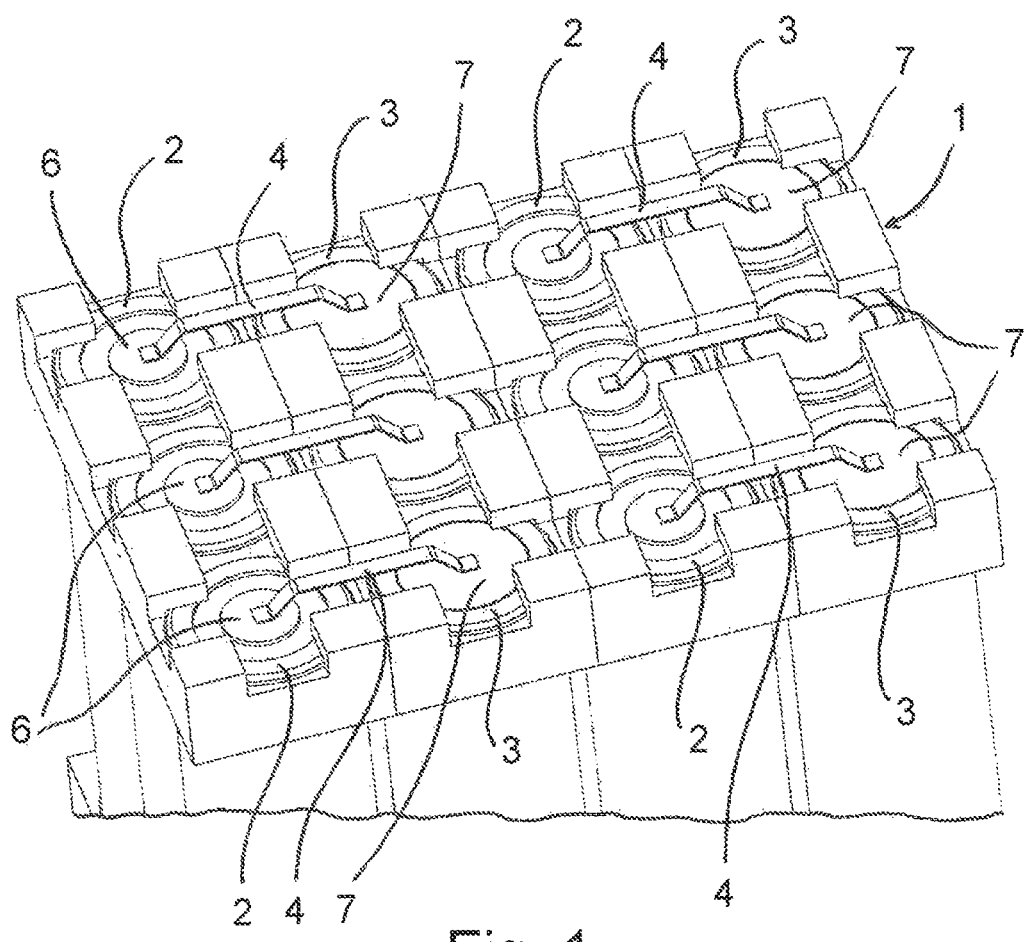
FIG. 1 shows a first configuration of a battery block manufactured by means of the ultrasonic bonding method according to the invention.

FIG. 1 shows a first configuration of a battery block formed from twelve battery cells 2, 3 arranged regularly in a 3×4 matrix formation. The battery block provides a first row of three first battery cells 2, arranged side by side, a second row of three second battery cells 3, a third row again of three first battery cells 2 and a fourth row again of three second battery cells 3. Battery cells 2, 3 are held by a housing 1 of the battery block.

Adjacent first battery cells 2 of the first row and second battery cells 3 of the second row as well as adjacent first battery cells 2 of the third row and second battery cells 3 of the fourth row are electrically contacted in pairs via connection conductors 4. In each case, a first connection contact surface 6 of first battery cells 2 is connected to a second connection contact surface 7 of second battery cells 3, in that connection points are produced between connection contact surfaces 6, 7, on the one hand, and connection conductors 4, on the other hand.

The connection points produced between connection conductor 4, on the one hand, and first connection contact 6 or second connection point 7, on the other hand, are integrally formed by ultrasonic bonding. Connection conductor 4 is pressed against connection contact surfaces 6, 7 by a bonding tool, which is not illustrated, and excited to vibrate ultrasonically via the bonding tool. In addition, connection conductor 4 and connection contact surfaces 6, 7 are heated with the aid of a laser. Connection contact surfaces 6, 7 are formed, for example, from nickel-coated steel, CnSn6, CuFe2 or by Sn-coated surfaces. Connection contact surfaces 6, 7 are thus, for example, particularly hard, fine-grained or provided by a material which has a non-plane-centered cubical lattice structure.

The battery block illustrated in FIG. 1 may always have, for example, the same battery cells 2, 3 in standard format 18650, battery cells 2, 3 having a diameter of 18 mm and a height of 65 mm. In configuring the battery block, the orientation of adjacent battery cells 2, 3 assigned to different rows is, however, selected in such a way that a series connection or contacting of adjacent battery cells 2, 3 is possible. First connection contact surface 6 thus defines a plus pole of first battery cell 2, and second connection contact surface 7 defines a minus pole of second battery cell 3. The contacting takes place via a strip as connection conductor 4, which has an essentially rectangular cross-section.

Figure 2:
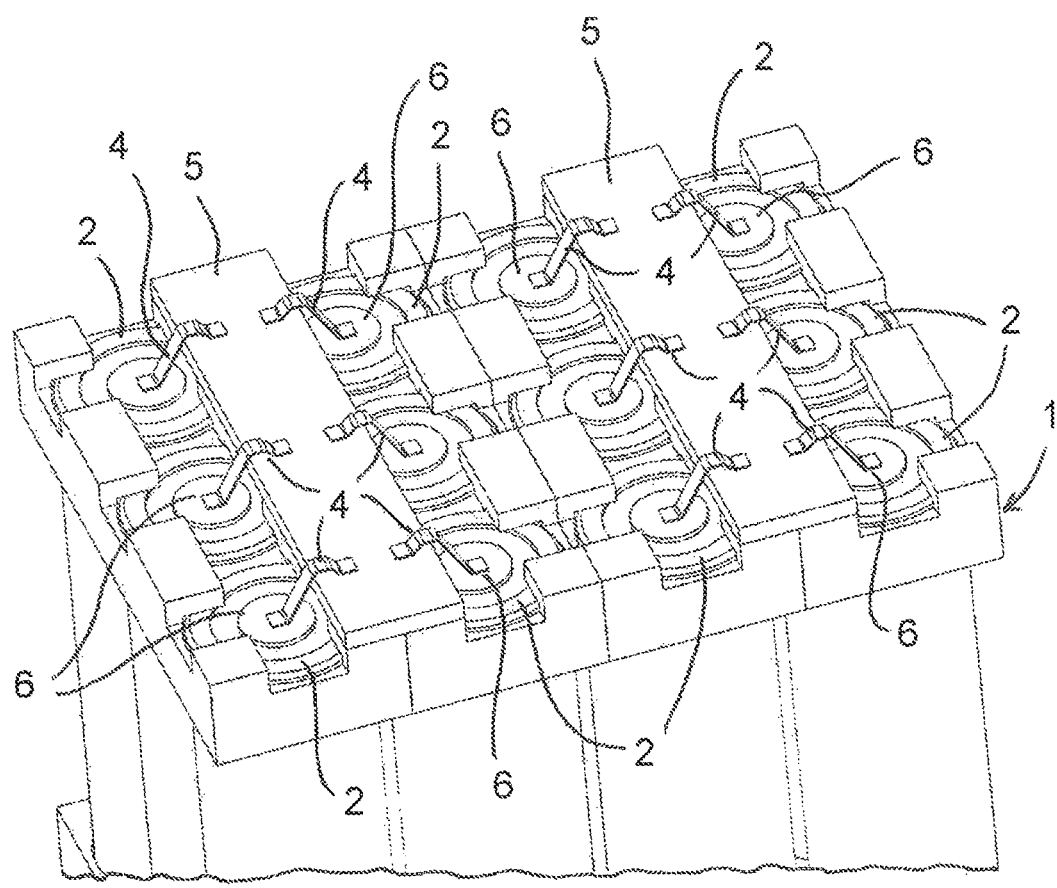
FIG. 2 shows a second configuration of the battery block manufactured by means of the ultrasonic bonding method according to the invention.

An alternative battery block according to FIG. 2 provides first battery cells 2 always in the same orientation in a 3×4 matrix arrangement. The contacting of first battery cells 2 here takes place via connection conductors 4, which are integrally connected to first connection contact surfaces 6 of first battery cells 2, on the one hand, and to common connection contacts 5, on the other hand. Common connection contacts 5 are designed in such a way that adjacent rows, each having three first battery cells 2, are always contacted together on one common connection contact 5.

When it comes to integrally contacting battery cells 2, 3, the method will depend on a normal force, at which the bonding tool is pressed against connection contact surface 6, 7 or common connection contact 5. In addition, an ultrasonic power as well as a laser power have a significant influence on the formation of the contact. Alternative configurations for the process parameters of normal force, ultrasonic power and laser power are illustrated in FIGS. 3 through 20 below.

The illustrated process parameters are normalized and simplified. In reality, it may be provided, for example, that the normal force is increased in the second half of the bonding process, or the ultrasonic power tends to be reduced toward the end of the bonding process. For example, the laser power may also be reduced toward the end of the bonding process.

Figure 3:
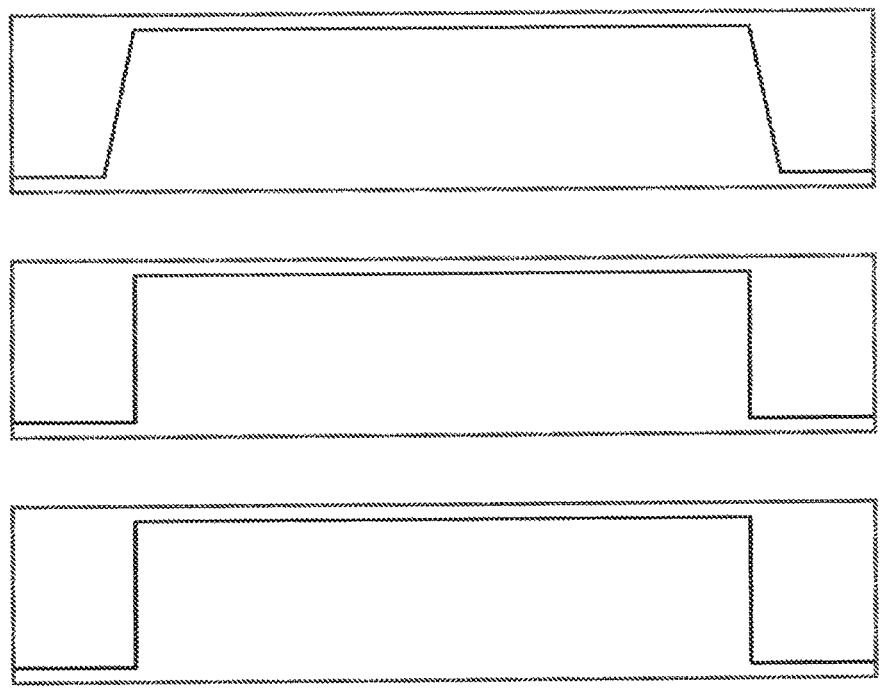
FIG. 3 shows a first example of a time characteristic of a normal force, an ultrasonic power and a laser power during the application of the ultrasonic bonding method according to the invention.

A first case according to FIG. 3, which is easy to implement in the method, provides that the bonding tool is simultaneously pressed on and excited to vibrate ultrasonically and the laser is activated. Since the normal force may be changed only slowly, compared to the two other process variables, the ultrasonic support and the laser power, a ramp-like rise or fall of the normal force is stored in the diagrams here, while an abrupt activate or supply is provided for the ultrasonic power and the laser power.

Figure 4:
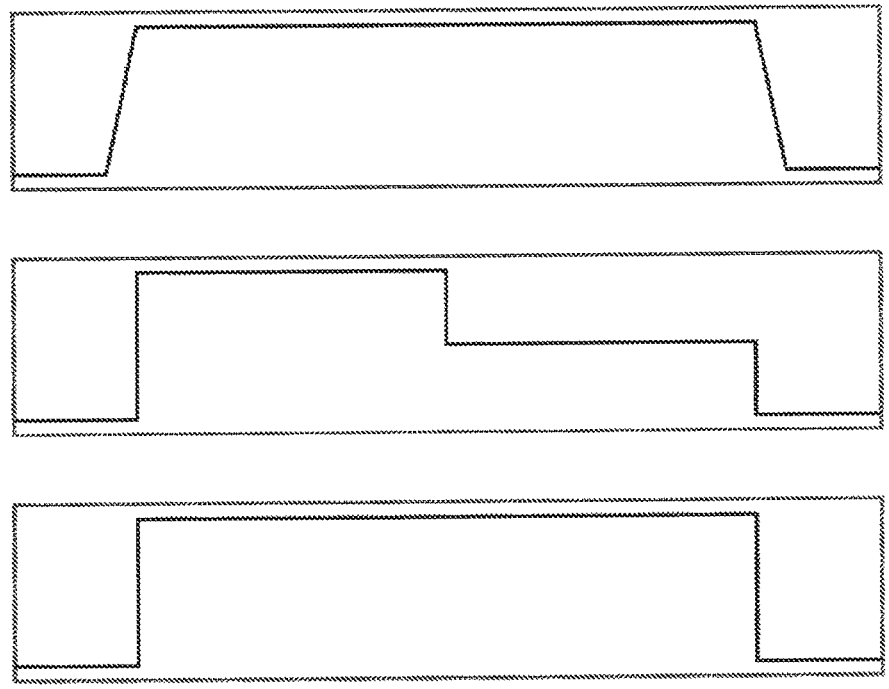
FIG. 4 shows a second example of the time characteristic of the normal force, the ultrasonic power and the laser power during the application of the ultrasonic bonding method according to the invention.

FIG. 4 shows a modified method, in which the ultrasonic power is changed or adapted during the process and is, in particular, abruptly reduced.

Figure 5:
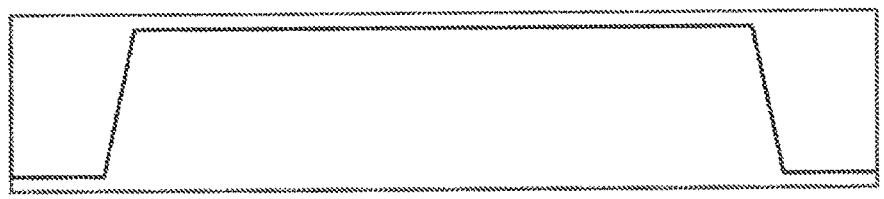
FIG. 5 shows a third example of the time characteristic of the normal force, the ultrasonic power and the laser power during the application of the ultrasonic bonding method according to the invention.
Figure 5:
Figure 5:
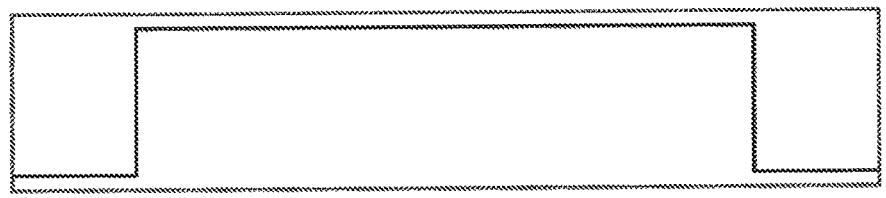
Figure 6:
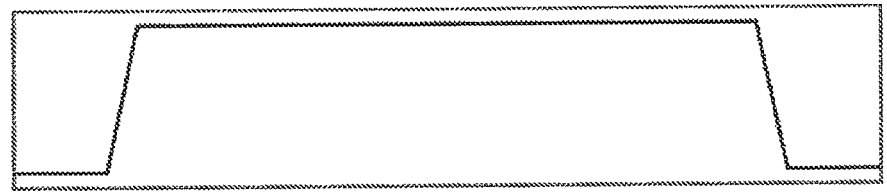
FIG. 6 shows a fourth example of the time characteristic of the normal force, the ultrasonic power and the laser power during the application of the ultrasonic bonding method according to the invention.
Figure 6:
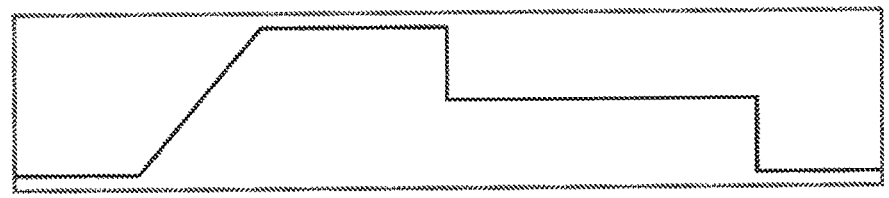
Figure 6:
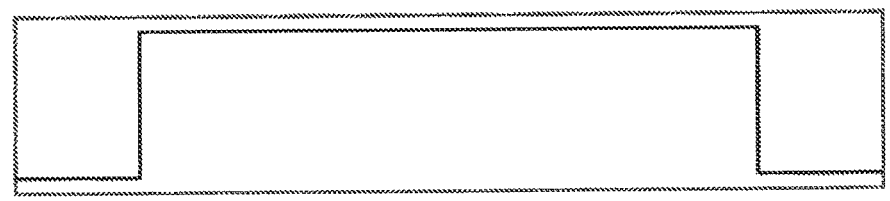

Alternatively, as illustrated in FIGS. 5 and 6, the ultrasonic power may be continuously increased or reduced.

Figure 7:
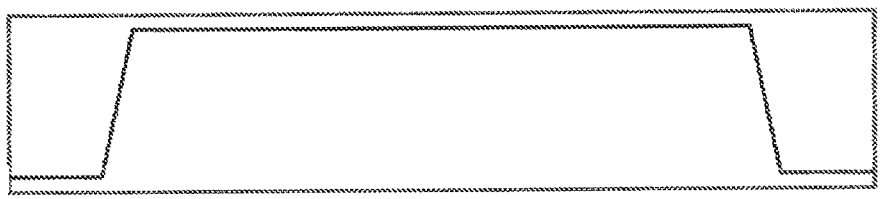
FIG. 7 shows a fifth example of the time characteristic of the normal force, the ultrasonic power and the laser power during the application of the ultrasonic bonding method according to the invention.
Figure 7:
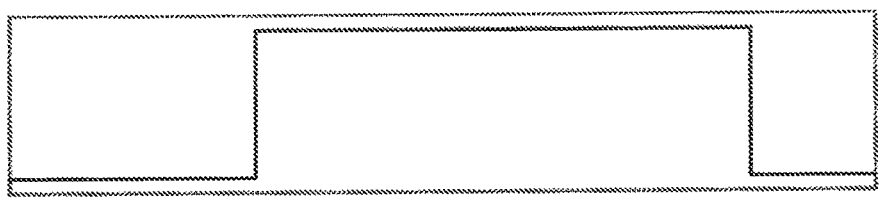
Figure 7:
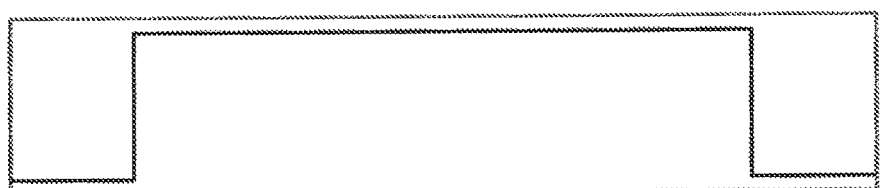

FIG. 7 shows that, the ultrasound may be supplied after the bonding tool has been pressed against connection contact surfaces 6, 7 or common connection contact 5 and the laser has been activated.

Figure 8:
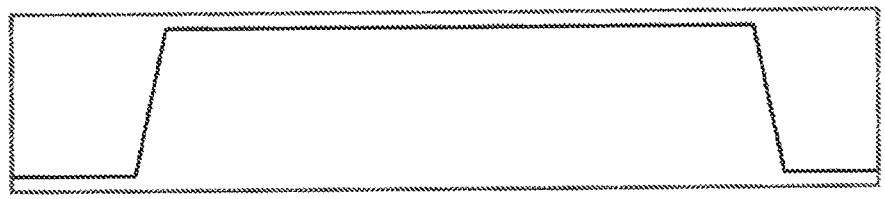
FIG. 8 shows a sixth example of the time characteristic of the normal force, the ultrasonic power and the laser power during the application of the ultrasonic bonding method according to the invention.
Figure 8:
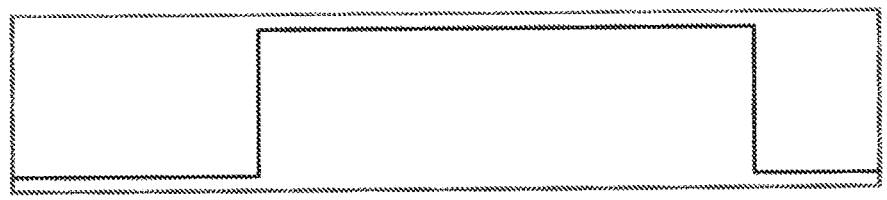
Figure 8:

Likewise, as illustrated in FIG. 8, the laser may be activated first and the bonding tool subsequently pressed against connection contact surfaces 6, 7 or common connection contact 5. The bonding tool is thus already preheated by the laser beam before it is set in place. After the placement, it is further heated, connection conductor 4 and connection contact surfaces 6, 7 or common connection contact 5 being also heated indirectly by the bonding tool. The ultrasound is not supplied until the joining partners to be connected have reached an elevated temperature. The temperature may be optionally monitored by sensors. A short process duration advantageously results, since the connection conductor and the joining partners may be rapidly heated, since the bonding tool has already been heated when it is set in place. Moreover, the wear on the bonding tool may be reduced, since the ultrasound is not activated until the joining partners have a lower solidity, due to the heating.

Figure 9:
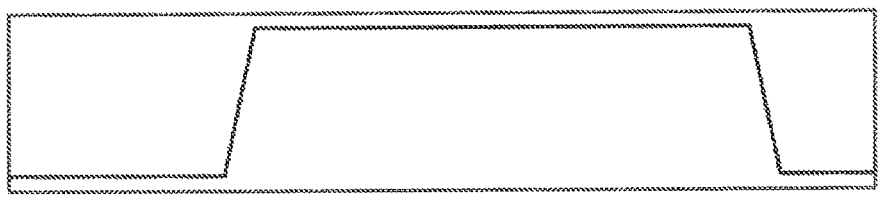
FIG. 9 shows a seventh example of the time characteristic of the normal force, the ultrasonic power and the laser power during the application of the ultrasonic bonding method according to the invention.
Figure 9:
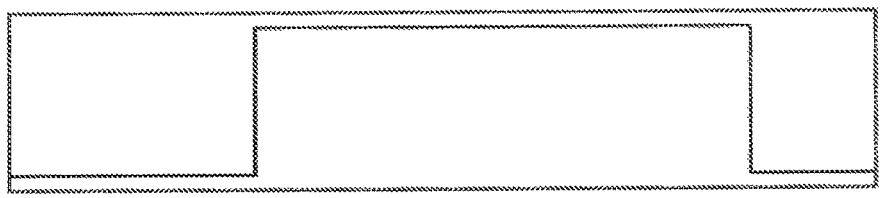
Figure 9:
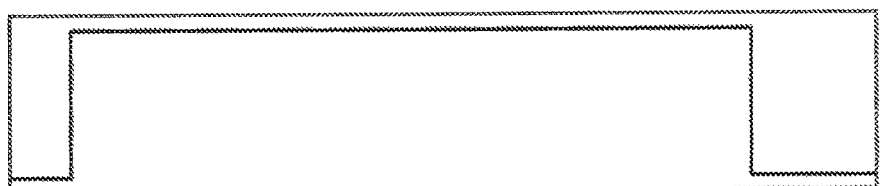

A further example for the ultrasonic bonding method according to the invention is shown in FIG. 9. In this case, the bonding tool is first preheated with the aid of the laser beam, and then, in a subsequent step, the heated bonding tool is simultaneously pressed against connection contact surfaces 6, 7 or common connection contact 5 and the ultrasound supplied.

Figure 10:
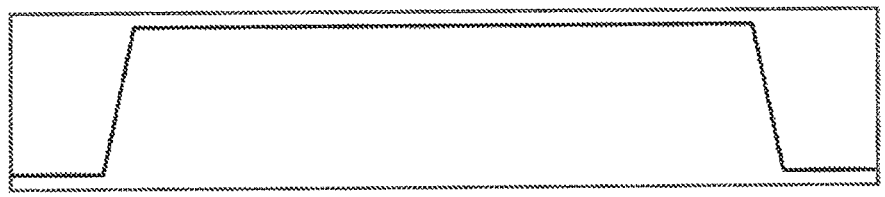
FIG. 10 shows an eighth example of the time characteristic of the normal force, the ultrasonic power and the laser power during the application of the ultrasonic bonding method according to the invention.
Figure 10:
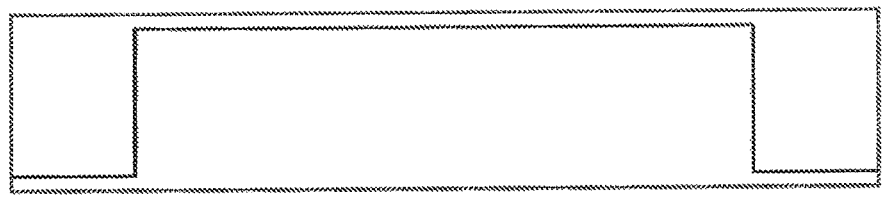
Figure 10:

FIG. 10 shows that the laser may be deactivated before the ultrasonic bonding process is concluded, in particular to avoid an impermissible heating of connection contact surface 6, 7 or common connection contact 5. In this case, the normal force and the ultrasonic power may thus be maintained longer than the laser is activated.

Figure 11:
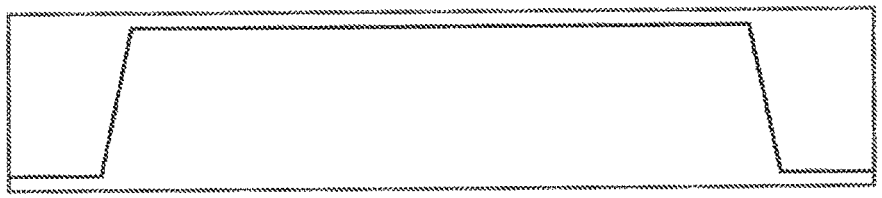
FIG. 11 shows a ninth example of the time characteristic of the normal force, the ultrasonic power and the laser power during the application of the ultrasonic bonding method according to the invention.
Figure 11:
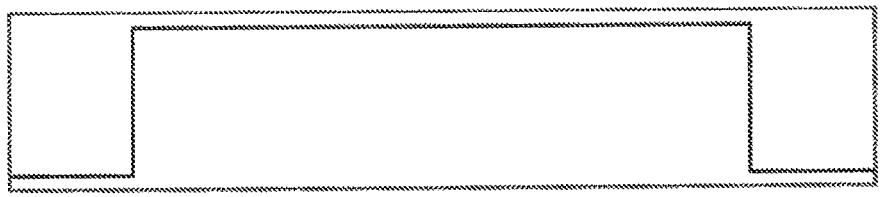
Figure 11:

FIG. 11 shows a modified form of the method variant described above. In this case, the laser power is not deactivated abruptly but is lowered over the course of time. A reduction of the laser power in the manner of a ramp is illustrated by way of example. This takes into account the fact that the joining partners are heated toward the end of the bonding process, and the formation of the connection is largely completed. The heat input is thus reduced, and the microstructure formation may be favored.

Figure 12:
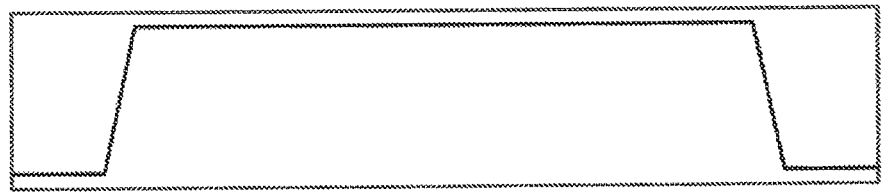
FIG. 12 shows a tenth example of the time characteristic of the normal force, the ultrasonic power and the laser power during the application of the ultrasonic bonding method according to the invention.
Figure 12:
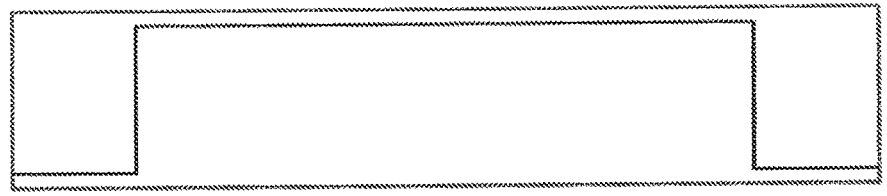
Figure 12:
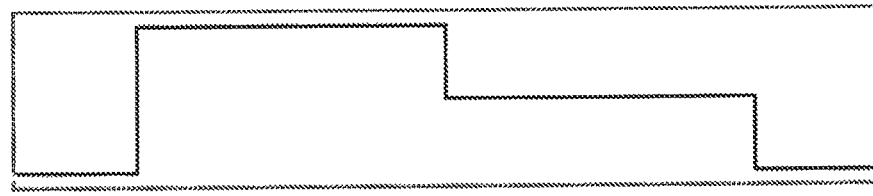

A further alternative of the above ultrasonic bonding method according to FIG. 12 provides for reducing the laser power in two stages. In particular, the laser power may be reduced and/or completely deactivated to avoid an impermissible heating of connection contact surface 6, 7 or common connection contact 5.

Figure 13:
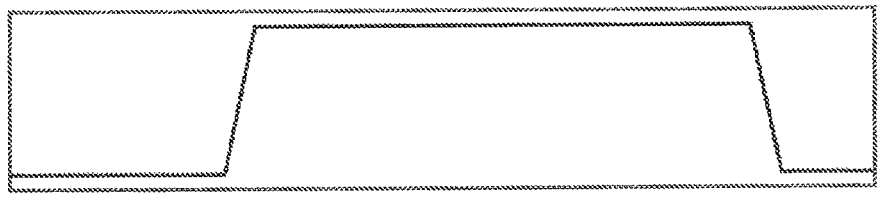
FIG. 13 shows an eleventh example of the time characteristic of the normal force, the ultrasonic power and the laser power during the application of the ultrasonic bonding method according to the invention.
Figure 13:
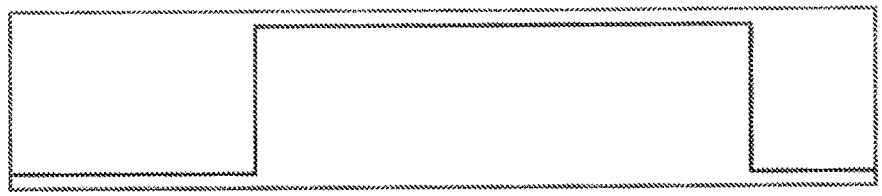
Figure 13:
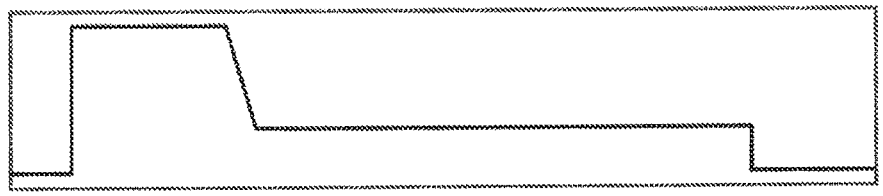

FIG. 13 shows a method variant, in which, to preheat the bonding tool, the laser power is increased before activating the ultrasound or before pressing on the bonding tool. On the whole, the process time may be reduced by preheating the bonding tool during the repositioning thereof.

Figure 14:
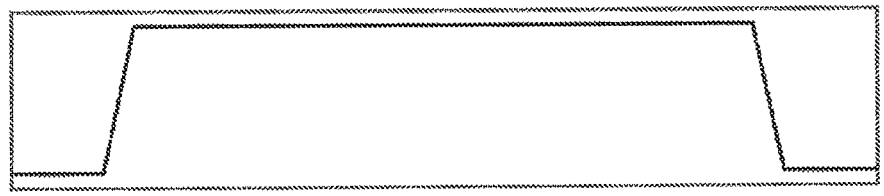
FIG. 14 shows a twelfth example of the time characteristic of the normal force, the ultrasonic power and the laser power during the application of the ultrasonic bonding method according to the invention.
Figure 14:
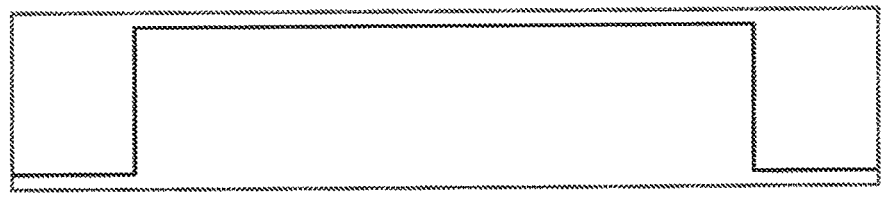
Figure 14:
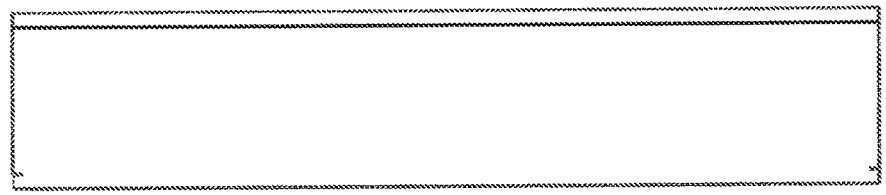

According to an example of the invention, it may be provided that the laser is operated continuously to heat the bonding tool (cf. FIG. 14).

Figure 15:
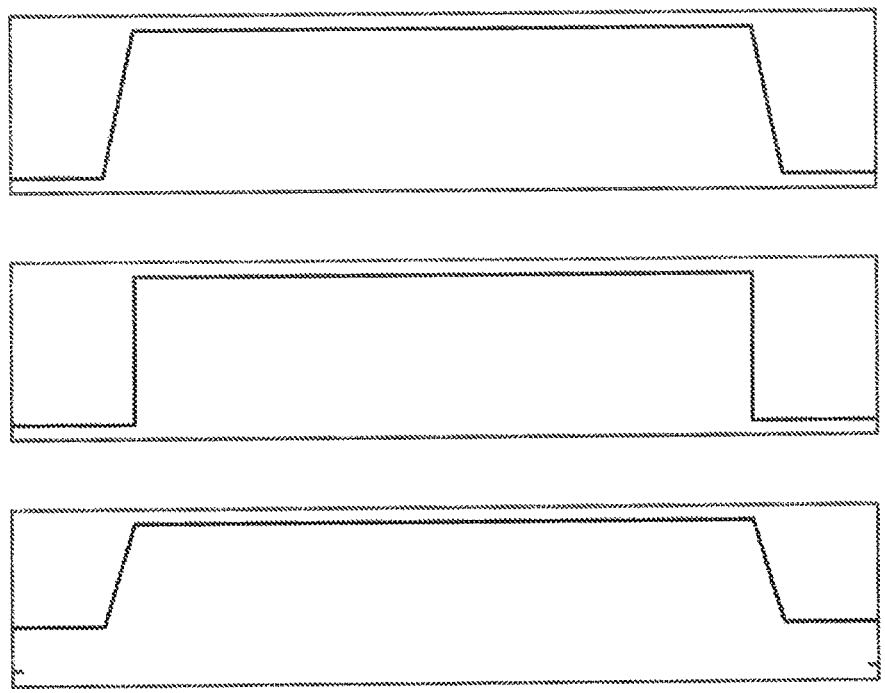
FIG. 15 shows a thirteenth example of the time characteristic of the normal force, the ultrasonic power and the laser power during the application of the ultrasonic bonding method according to the invention.

Alternatively, according to FIG. 15, it may be provided that a continuously operated laser is provided, and the laser power is temporarily increased while the bonding tool is being pressed against connection contact surface 6, 7 or common connection contact 5 and/or the ultrasound is being supplied. The bonding tool is thus heated continuously at low power with the aid of the laser beam. When the bonding tool presses the connection conductor 4 against connection contact surfaces 6, 7 or common connection contact 5, the laser power is increased so that more heat flows in the direction of the joining partners. Due to the continuous heating of the bonding tool, in particular, the bonding time may be reduced or kept short. Connection conductor 4 and the joining partners thus heat up comparatively rapidly.

Figure 16:
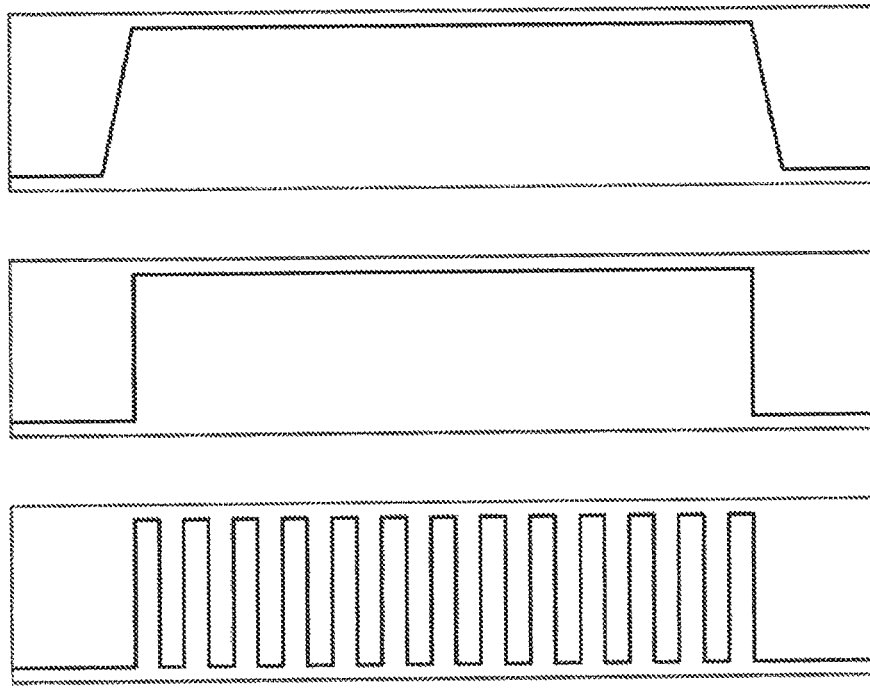
FIG. 16 shows a fourteenth example of the time characteristic of the normal force, the ultrasonic power and the laser power during the application of the ultrasonic bonding method according to the invention.
Figure 17:
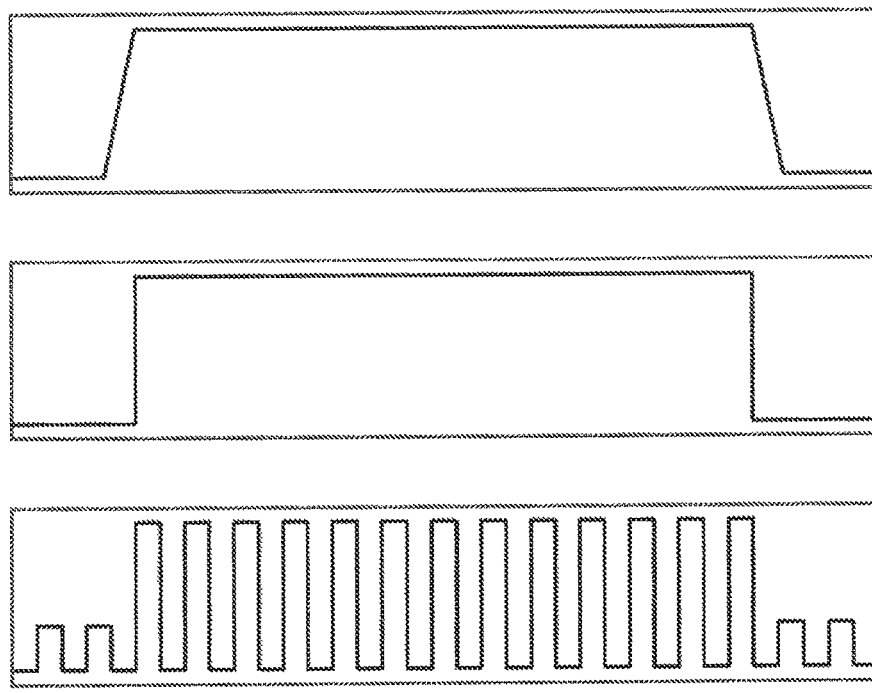
FIG. 17 shows a fifteenth example of the time characteristic of the normal force, the ultrasonic power and the laser power during the application of the ultrasonic bonding method according to the invention.

The laser may be operated in a pulsed manner. Corresponding variants of the ultrasonic bonding method are illustrated in FIGS. 16 and 17. In pulsed mode, the laser power and the pulse frequency may be selected in such a way that an equivalent thermal effect with regard to the bonding tool, on the one hand, and the joining partners, on the other hand, may be achieved, compared to the non-pulsed mode. For example, the laser power shown in FIG. 16 may correspond to the laser power according to FIG. 3. The pulsed mode is useful, for example, when the laser may be operated only in a pulsed manner, due to its design, and/or when the laser power cannot be set as low as would be useful for an optimal heating of the bonding tool or the joining partners.

Figure 18:
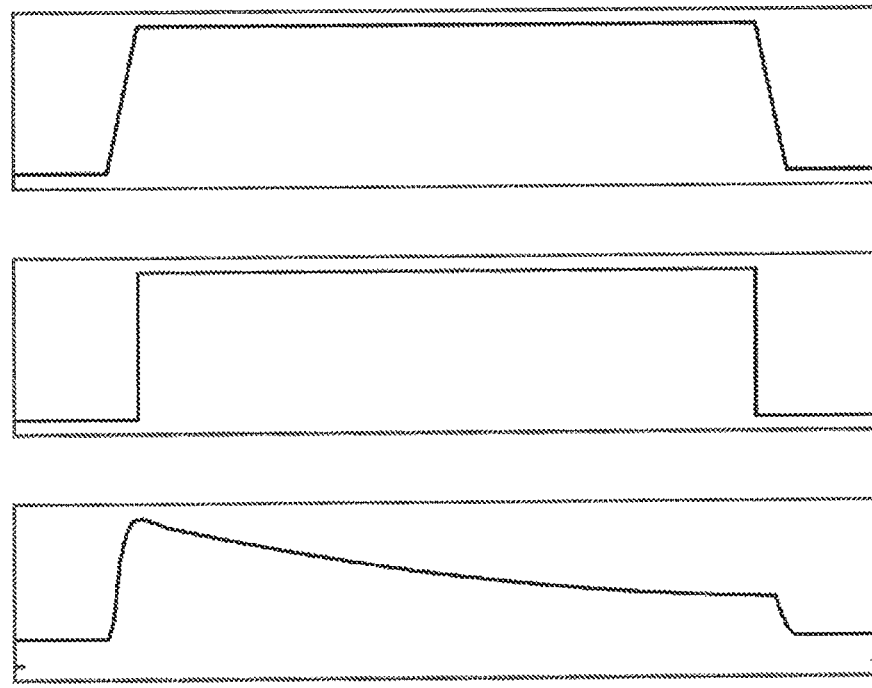
FIG. 18 shows a sixteenth example of the time characteristic of the normal force, the ultrasonic power and the laser power during the application of the ultrasonic bonding method according to the invention.

FIG. 18 makes it clear that the laser power may be individually selected or controlled as needed. For example, a temperature of connection contact surface 6, 7 or common connection contact 5 may be determined with the aid of a sensor component, and the laser power may be adapted as a function of the temperature in such a way that an integral connection between battery cells 2, 3 and connection conductor 4 or common connection contact 5 is always safely and reliably established.

The bonding tool is continuously warmed or heated at a low laser power and held at an elevated operating temperature. This is equally true for the production of the individual connection points and in the time therebetween, for example during the movement and/or repositioning of the bonding tool, since the heating time for the bonding tool may be reduced hereby and/or the process stability as well as the bond quality may be improved.

Once the bonding tool has been set in place and connection conductor 4 has been pressed against connection contact surface 6, 7 or common connection contact 5, the laser power is increased to thereby heat the joining partners. During the bonding process, the laser power is thus regulated or continuously reduced to keep the temperature of the bonding tool constant despite the rising temperature of the joining partners and thereby the low heat outflow. An elevated process speed advantageously results due to the preheating of the bonding tool and a uniform heating of the bonding tool and the joining partners by the temperature regulation. For example, the bonding tool may be temporarily very significantly heated if the temperature of the joining partners is monitored and it may be ensured that an impermissibly high temperature of the joining partners by the process control may be avoided.

In the diagram illustrations according to FIGS. 14, 15 and 18, it is shown that the laser is not deactivated after the production of the first connection point and/or the second connection point and continues to be operated at full or reduced laser power. This applies to the case that at least one further connection point is produced after the currently produced connection point. Of course, the laser may be turned off, or the laser is turned off when all connection points are produced on the currently processed battery block, or the ultrasonic laser bonding device provided for carrying out the method is turned off.

Figure 19:
FIG. 19 shows a seventeenth example of the time characteristic of the normal force, the ultrasonic power and the laser power during the application of the ultrasonic bonding method according to the invention.
Figure 19:
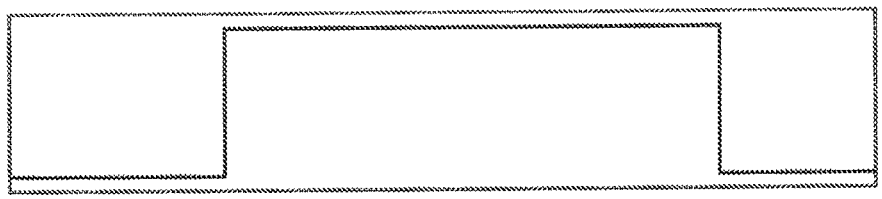
Figure 19:
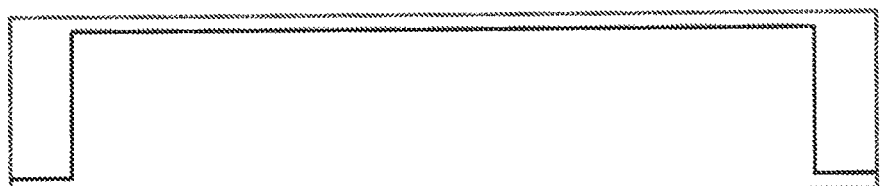
Figure 20:
FIG. 20 shows an eighteenth example of the time characteristic of the normal force, the ultrasonic power and the laser power during the application of the ultrasonic bonding method according to the invention.
Figure 20:
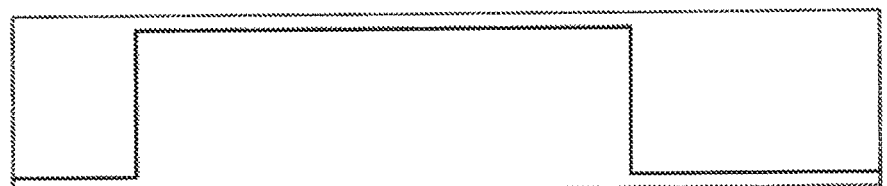
Figure 20:
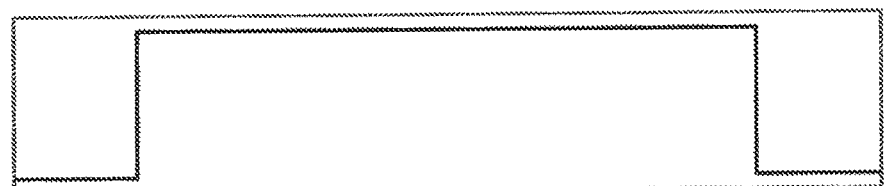

Two further variants of the ultrasonic bonding method according to the invention are illustrated in FIGS. 19 and 20. In this case, the ultrasonic power is only temporarily provided, and more heat may be introduced into the connection point with the aid of the laser after the ultrasound has been deactivated.

With regard to carrying out the method according to the invention, it should be noted that the process duration may be adapted, depending on the material properties of the different connection contact surfaces 6, 7 or common connection contacts 5, and in particular, the second connection point may also be produced in the conventional manner on common connection contact 5, and a heating with the aid of the laser may thus be dispensed with for the second connection point.

With respect to the ultrasonic bonding method according to the invention, it is not important whether the first connection point is produced first, followed by the second connection point, or whether the second connection point is produced first, followed by the first connection point. Likewise, three or more connection points may be produced on one connection conductor 4.

Identical components and component functions are marked by the same reference numerals.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for the electrical contacting of a plurality of battery cells of a battery block, the method comprising:
producing a first connection point by
heating a bonding tool directly,
heating a first connection contact surface of a first battery cell locally and indirectly by a laser beam provided by a laser and directed toward the bonding tool,
pressing a connection conductor against the first connection contact surface of the first battery cell with the aid of the bonding tool, and
exciting the bonding tool to vibrate ultrasonically, the ultrasonic vibrations being transferred from the bonding tool to the connection conductor; and
producing a second connection point by
pressing the connection conductor against a second connection contact surface of a second battery cell of the battery block by the bonding tool, and
exciting the bonding tool to vibrate ultrasonically.

2. The method according to claim 1, wherein, during the production of the second connection point, the bonding tool is heated directly with the aid of the laser beam and, as a result of the heating of the bonding tool, the connection conductor and/or the second connection contact surface and/or the common connection contact are heated thereby indirectly and locally in each case with the aid of the bonding tool.

3. The method according to claim 1, wherein a plurality of first connection contact surfaces of different first battery cells are connected to a shared common connection contact by a plurality of connection conductors corresponding to the number of different first battery cells.

4. The method according to claim 1, wherein the first connection contact surface of the first battery cell is connected to the second connection contact surface of a second battery cell arranged adjacent to the first battery cell.

5. The method according to claim 1, wherein the bonding tool is heated directly with the aid of the laser beam, and the first connection contact surface and/or the second connection contact surface and/or the common connection contact are heated indirectly with the aid of the bonding tool while the connection conductor is being pressed against the first connection contact surface and/or the second connection contact surface or the common connection contact and/or is excited to vibrate ultrasonically.

6. The method according to claim 1, wherein an ultrasonic power is reduced and/or lowered to zero during the production of the first connection point and/or the second connection point.

7. The method according to claim 1, wherein the bonding tool is heated with the aid of the laser beam before the connection conductor is pressed on with the aid of the bonding tool and/or is excited to vibrate ultrasonically.

8. The method according to claim 1, wherein the laser is deactivated while the connection conductor is being pressed against the first connection contact surface and/or the second connection contact surface and/or the common connection contact by the bonding tool and/or is excited to vibrate ultrasonically.

9. The method according to claim 1, wherein the laser is operated in a pulsed manner during the direct and/or indirect heating of the bonding tool and/or the first connection contact surface and/or the second connection contact surface and/or the common connection contact.

10. The method according to claim 1, wherein the laser continues to be operated after the ultrasound is deactivated.

11. The method according to claim 1, wherein the first connection contact surface and/or the second connection contact surface is provided as a CuSn2 connection contact surface and/or a CuFe2 connection contact surface and/or is provided on nickel-coated steel and/or is provided by an Sn-coated surface.

12. The method according to claim 1, wherein the laser beam is guided in a longitudinal recess, which is provided in the bonding tool, and/or the laser beam is directed onto a tool tip of the bonding tool.

13. The method according to claim 1, wherein the laser is operated continuously in such a way that a deactivation of the laser does not take place after the production of the first connection point and/or the second connection point, if at least one further connection point is also produced.

14. A method for the electrical contacting of a plurality of battery cells of a battery block, the method comprising:
producing a first connection point by
heating a bonding tool directly,
heating a connection conductor locally and indirectly by a laser beam provided by a laser and directed toward the bonding tool,
pressing the connection conductor against a first connection contact surface of a first battery cell with the aid of the bonding tool, and
exciting the bonding tool to vibrate ultrasonically, the ultrasonic vibrations being transferred from the bonding tool to the connection conductor; and
producing a second connection point by
pressing the connection conductor against a second connection contact surface of a common connection contact of the battery block by the bonding tool, and
exciting the bonding tool to vibrate ultrasonically.

15. A method for the electrical contacting of a plurality of battery cells of a battery block, the method comprising:
producing a first connection point by
heating a bonding tool directly,
heating a first connection contact surface of a first battery cell and a connection conductor locally and indirectly by a laser beam provided by a laser and directed toward the bonding tool,
pressing the connection conductor against the first connection contact surface of the first battery cell with the aid of the bonding tool, and
exciting the bonding tool to vibrate ultrasonically, the ultrasonic vibrations being transferred from the bonding tool to the connection conductor; and
producing a second connection point by
pressing the connection conductor against a second connection contact surface of a second battery cell of the battery block by the bonding tool, and
exciting the bonding tool to vibrate ultrasonically.

* * * * *